United States Patent
Fryman et al.

(10) Patent No.: US 11,960,922 B2
(45) Date of Patent: Apr. 16, 2024

(54) SYSTEM, APPARATUS AND METHOD FOR USER SPACE OBJECT COHERENCY IN A PROCESSOR

(71) Applicant: Intel Corporation, Santa Clara, CA (US)

(72) Inventors: Joshua B. Fryman, Corvallis, OR (US); Jason M. Howard, Portland, OR (US); Ibrahim Hur, Portland, OR (US); Robert Pawlowski, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 614 days.

(21) Appl. No.: 17/030,999

(22) Filed: Sep. 24, 2020

(65) Prior Publication Data

US 2022/0091987 A1    Mar. 24, 2022

(51) Int. Cl.
*G06F 9/46* (2006.01)
*G06F 9/30* (2018.01)
*G06F 9/38* (2018.01)
*G06Q 10/101* (2023.01)

(52) U.S. Cl.
CPC ............ *G06F 9/466* (2013.01); *G06F 9/3004* (2013.01); *G06F 9/30043* (2013.01); *G06F 9/3834* (2013.01); *G06F 2212/452* (2013.01); *G06Q 10/101* (2013.01)

(58) Field of Classification Search
CPC .... G06F 9/466; G06F 9/3834; G06F 9/30043; G06F 9/3004
See application file for complete search history.

(56) References Cited

U.S. PATENT DOCUMENTS

| | | | |
|---|---|---|---|
| 7,395,382 B1 * | 7/2008 | Moir .................. | G06F 9/466 711/147 |
| 2002/0103819 A1 * | 8/2002 | Duvillier ............. | G06F 16/22 |
| 2003/0061256 A1 * | 3/2003 | Mathews ............. | G06Q 30/06 718/101 |
| 2012/0124563 A1 * | 5/2012 | Chung ................. | G06F 9/467 717/140 |
| 2019/0043540 A1 * | 2/2019 | Chagam Reddy .. | G06F 12/0246 |
| 2020/0183695 A1 * | 6/2020 | Harper, III ......... | G06F 9/384 |
| 2021/0255890 A1 * | 8/2021 | Milburn ............... | G06F 9/3013 |

OTHER PUBLICATIONS

Wikipedia, "Intel iAPX 432," entry last edited on May 4, 2020, 7 pages total.

* cited by examiner

*Primary Examiner* — Jacob Petranek
(74) *Attorney, Agent, or Firm* — Trop, Pruner & Hu, P.C.

(57) ABSTRACT

In an embodiment, a processor comprises: an execution circuit to execute instructions; at least one cache memory coupled to the execution circuit; and a table storage element coupled to the at least one cache memory, the table storage element to store a plurality of entries each to store object metadata of an object used in a code sequence. The processor is to use the object metadata to provide user space multi-object transactional atomic operation of the code sequence. Other embodiments are described and claimed.

16 Claims, 12 Drawing Sheets

| Virtual Address 212 | Size 214 | Version # 215 | Intent 216 | Token 218 | Flags 219 |
|---|---|---|---|---|---|
| A | S(A) | A @ t0 | RD | 42 | OK |
| B | S(B) | A @ t1 | RD | 42 | OK |
| C | S(C) | A @ t2 | RD | 42 | OK |
| D | S(D) | A @ t3 | WR | 42 | OK |
| E | S(E) | A @ t4 | RMW | 42 | OK |

FIG. 2

| TLB Tag 312 | Virtual Address Base 314 | Physical Address Base 315 | Size 316 | Flags 318 |
|---|---|---|---|---|
| ... | 4K[A] | Phys Addr 1 | 4KB | Map[A], Map [B], Map [C] |
| ... | 4K[C] | Phys Addr 2 | 4KB | Map [C] |
| ... | 4K[E] | Phys Addr 3 | 4KB | Map [E] |

FIG. 3

| Cache Tag 412 | Physical Address 414 | MOESI 415 | Flags 416 | Data [511:0] 418 |
|---|---|---|---|---|
| ... | Phys Addr [A] | S | Map[A] | A.Vers#, A.Data |
| ... | Phys Addr [B] | S | Map[B] | B.Vers#, B.Data |
| ... | Phys Addr [C] | S | Map[C] | C.Vers#, C.Data |
| ... | Phys Addr [D] | E | Map[D] | D.Vers#, D.Data |
| ... | Phys Addr [E] | E | Map[E] | E.Vers#, E.Data |

SYSTEM, APPARATUS AND METHOD FOR USER SPACE OBJECT COHERENCY IN A PROCESSOR

TECHNICAL FIELD

Embodiments relate to managing coherency of objects in a processor.

BACKGROUND

Software programming for at-scale computation paradigms presents complex performance challenges. Programmers often deal with massive concurrency problems where software performant constructs require understanding of fine-grained locks, sequencing, multiple algorithmic approaches, and elaborate data structures. Without careful orchestration by the programmer, these workloads will demonstrate non-deterministic execution behavior when they span multiple nodes, thousands of cores, and complex latency hierarchies to memory.

Recent graduates with a programming background no longer learn these low-level programming constructs and languages. With a focus only on time-to-solution, high-level interpreted languages are the new norm, where all complexity is hidden under various libraries that remove that complexity from the programmer. These modern programmers lack even exposure to low-level languages, synchronization constructs, and similar building blocks, and thus lack the foundation to handle at-scale performance challenges which come after the initially developed solution. The reliance on frameworks and libraries under interpreted languages leaves these programmers unable to quickly handle situations that do not cleanly fit within those pre-made constructs. As such, current architectures expose program inadequacies when scaled, and may break software conventions for locking and reaching livelock or deadlock states in a program.

BRIEF DESCRIPTION OF THE DRAWINGS

FIG. 2 is a block diagram of a map table in accordance with an embodiment.

FIG. 3 is a block diagram of a translation lookaside buffer in accordance with an embodiment.

FIG. 4 is a block diagram of a cache memory in accordance with an embodiment.

DETAILED DESCRIPTION

Figure 1:
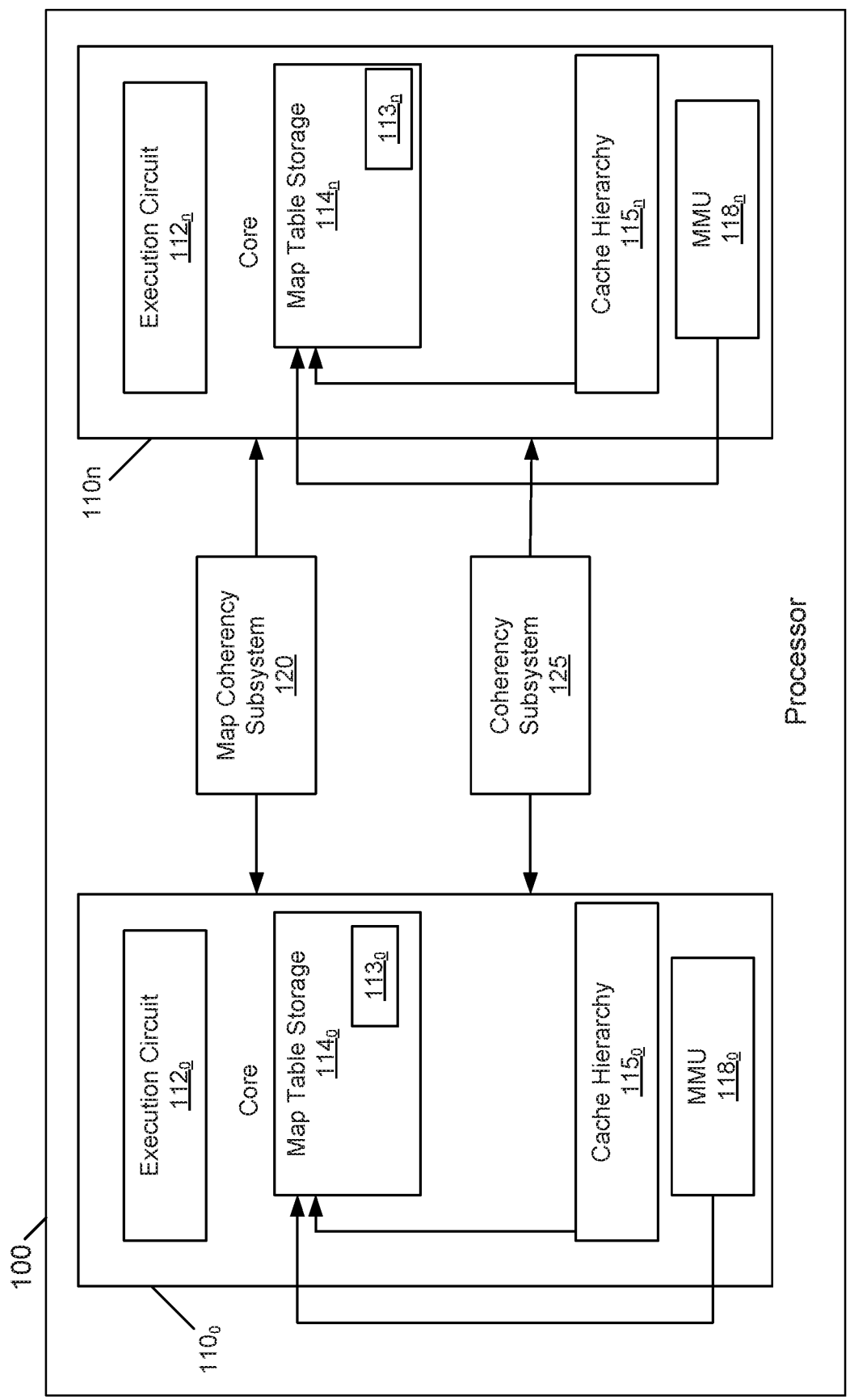
FIG. 1 is a block diagram of a processor in accordance with an embodiment.

In various embodiments, a processor architecture is provided with a hardware scheme to enable transparent atomicity of extended instruction sequences. These hardware extensions and associated instructions of an instruction set architecture (ISA) facilitate frameworks and compilers to reap the benefits of low-level management without the complexity of explicit scheduling and elaborate software branches to handle multiple scenarios. In this way, the gap between what historical programmers have managed and future trend programming frameworks for productivity emphasis can be closed.

A representative example of a common programming problem in at-scale constructs is shown below in Table 1. As shown at a high level, contents from several "objects" are read prior to performing a local (ephemeral) calculation, and then other "objects" are written to post the side effects of that calculation. The entire sequence of reading objects through writing objects is treated as one atomic operation, also known as a transaction. If the objects that were read for the local calculation are modified by other concurrent parts of the program, this entire transaction cannot be posted, it is instead restarted. Once this transaction begins writing results to memory, all objects that will be written are held in exclusive access such that no other concurrent parts of the program may read or write them before this transaction completes.

TABLE 1

```
// do stuff
  sequence {
    rd_obj( A )
    rd_obj( B )
    rd_obj( C )
    // calculate something locally
    wr_obj( D )
    wr_obj( E )
  } times(5) {
    // handle high conflict condition
    // ideally, implicit act not explicit coding
  }
```

In this example, all operations inside the pseudo-code "sequence { . . . }" construct present the work of a transaction to be maintained as an atomic operation. Due to contention in a system, it is quite possible that repeated contention over the atomicity property on objects will cause multiple sequence restarts, triggering replay storms for the transaction. For that reason, the pseudo-code "times(N) { . . . }" construct is meant to be a fallback case in the presence of failure to make forward progress after N tries (here, N=5 in "times(5)"). In this case, programmers typically implement a work-around strategy, from exponential backoff delays to alternate code paths or emulations. This explicit handling of failures due to contention is a further burden on programmers, requiring further specialized knowledge, analysis, and skills. Traditionally, making such a sequence work correctly with performance requires deep expertise to fully implement properly. A better solution is for a construct that does not require the "times(N) { . . . }" component, instead transparently handling the situation when conflicts arise while still ensuring forward progress.

The goal of this high-level productivity "sequence { . . . }" construct is straightforward in that it enables programmers to focus on the actual work to be done, and not on the details of synchronization or locking properties to achieve that work. With a proper set of hardware support mechanisms in accordance with an embodiment, this style of transparent locking through highly functional transactional semantics will close the gap between future programmer goals and current hardware limitations.

While this canonical example is simple for demonstration purposes, there are a few properties to be understood for real-world use and potential implementations: objects will typically not be statically known, but are rather dynamic object pointers that are resolved at runtime; interactions within a modern complex operating system will expose additional challenges working through regions that are bound via application programming interface (API) calls such as mmap, mremap, shmat, shm_open, etc. and manipulate the address space during execution; locking objects are taken in a consistent order at all spots in the total program to avoid deadlock situations; the operating system and dynamic runtime, particularly with interpreted or byte-code languages, remap user-space virtual address to different physical addresses over time due to memory contention and paging; and objects that are observed at the start of a transaction with a value A may be changed by other (concurrent) portions of the program to create a new value B while yet another part of the program changes it back to A, thus leading to detection of the A/B/A problem.

In embodiments herein, a hardware table, referred to herein as a map table, may be used to provide a low-overhead, low-complexity solution to programmers who are trying to implement software on scalable systems. As described herein, in an embodiment a map table may be provided on a per core basis. Using an embodiment, a programmer (or compiler) may choose which objects to track. In turn, the map table in operation deals with conflicts and object-level coherency between users in the background, without explicit programmer support.

As used herein, the term virtual address space is used to refer to user software that operates on a virtual address (VA) space which may not be contiguous, and may expand or shrink during runtime based on program behavior. The operating system and/or runtime coordinate how the virtual space is managed. The virtual space may contain aliases, such that any two virtual addresses may map to the same unique storage location. In turn, a physical address space of a system is a memory address that acts on a unique real physical address (PA) map, such that no two addresses in the physical space can point to the same unique memory location. The physical address spaces may not be contiguous, and may contain regions with unique properties (non-volatile, read-only, access latency, etc.).

Conversion from the VA space to the PA space is performed by a translation unit, which may be implemented as a memory management unit, which may be a hardware unit under programmable control. A translation lookaside buffer (TLB) is a common hardware mechanism to accelerate the mechanism of a translation unit from VA to PA spaces, with various implementation styles.

Any program or workload that is run on a platform is called a process, contained within an operating system unit for tracking. A process has at least one hardware context of execution. The entire address space that is part of a process, including all components, is referred to as a process address space. Process address spaces are unique within a process and its execution context(s) or threads, but are not necessarily unique across processes. Some common shared libraries may be mapped at the same address across multiple processes for simplicity in the runtime or operating system. The process address space is typically considered the global address space within the limits of that process. The operating system or runtime owns the overall translation unit tables to calculate all VA to PA conversions for all components of the process address space.

In turn, a process may contain multiple executing hardware contexts, where each context is a thread, such that these threads are all only part of the same process address space. Each thread may run any arbitrary part of the program. A process has at least one thread for executing instructions. Threads may have a subset of the process address space translation unit tables active.

Within the process address space, a portion referred to as a heap is reserved for the dynamic allocation of memory such as from C calls of malloc( ) or free( ). The heap resides in the process address space. The heap is sized for maximum expected dynamic memory in the total process execution. A stack is a space for spilling and restoring temporary values, for use by an executing hardware context. Each thread may be given a portion of the process address space to use as a private stack, including the area to save the executing hardware context state when a thread is stopped or started. Commonly, there is no ensured enforcement of actual exclusive access to the address space used for the stack. Threads may use a space like the stack to hold their own miniature heap-like construct, or addressable scratchpads, which is called thread local storage (TLS). This space may be used for many things, but as with the stack commonly it has no ensured enforcement of actual exclusive access. Thus a process address space may include a global state and a heap. In turn, each thread may have, within the process address space, a stack and a TLS.

The property of atomicity applies to the inability for two or more threads in any collection of processes to see partially resolved state inside a read-modify-write operation. Typically, atomicity is considered as a behavior for a single instruction, such as cmpxchg or xadd. In these operations, there is a read operation of the current value, followed by a decision, and then a potential store of a new value to the same location. Between the read and the store, some other threads in the system could observe or alter the contents of the same location. The property of atomicity is one where once a thread has begun an atomic operation, no other thread may access the affected location(s) until the initiating thread releases that location from the atomic operation sequence.

Applying atomicity properties to a sequence of operations that are beyond a single read-modify-write instruction at the hardware level is typically called a transaction. Transactions generally implement atomicity across potentially multiple read locations, several evaluations and calculation, and multiple write locations. Encasing all these operations into one sequence with atomicity is a transaction.

With embodiments, all processes, threads, heaps, stacks, and TLS follow the previously described arrangements. Translation unit configuration information is consistent at the process address space level, and all threads may operate on a subset of that common set of tables. Whether using actual object-oriented programming constructs or more classic data structures, program data accessed under transactional semantics are referenced via these structures and are referred to herein as objects. Each object holds an extra field, automatically generated by the compiler. In an embodiment, this additional field may be included at a first address in the object data. Specifically, this extra field may be used to provide a "version number" counter. In an embodiment, the compiler may initialize this version number to zero. Then, during a transaction execution, and more specifically on a global write to an object, this version number may be incremented. In an embodiment, the compiler may automatically insert an increment of this "version number" field within the "wr_object" functionality as shown in the canonical example of Table 1. In one embodiment, the size of this field may be configured to ensure that wraparound does not leave the program subject to A/B/A inversion errors. A field size of eight bytes treated as an unsigned integer may be used in one embodiment.

During compilation of a code sequence such as of the style shown in Table 1, the compiler may generate transactional semantics using instructions described herein. Note that inside the transactional window, the compiler may use the TLS for all ephemeral calculations. All global state writes are done inside the "wr_object( . . . )" high-level semantics from the canonical example.

Objects are accessed in some form of read or write sequencing, as shown in the canonical example of Table 1. When any particular object needs more complex read-modify-write semantics, it may perform the initial access under the "rd_object" operation, uses local storage for intermediate calculations, and then uses "wr_object" as the operation for updates to the actual object. Note that information and data of objects in transactions are accessed and held in structures such as the TLB and cache. During runtime, hardware-limited structures such as these (TLB, cache) may have evictions due to various reasons (coherency, capacity, process migration, etc.).

With embodiments, a configurable object tracking system is provided for a user space, and coherency is enforced across tracked objects with hardware support. With embodiments, compilers (and explicit programmers) may use ISA-based instructions to dynamically enumerate objects of interest, registering them with a process space specific map table against which hardware enforces object coherency checks across that process.

Referring now to FIG. 1, shown is a block diagram of a processor in accordance with an embodiment. As shown in FIG. 1, processor 100 may be any type of multicore processor. As illustrated, processor 100 includes cores $110_0$-$110_n$. In embodiments herein, cores 110 may be configured with hardware to support automatic enforcement of user-space objects.

As shown, core 110 includes a map table storage 114 that may include a plurality of entries each to store information regarding objects to be accessed in a transaction. In the embodiment shown, map table storage 114 includes a control circuit 113 that may control addition, removal and update of entries and information included in the entries. In an embodiment, control circuit 113 may have a hardware protocol, similar to how caches maintain coherency, to maintain proper consistency and coherency across map table storages, e.g., based on user code addition/removal markings of intent.

As further illustrated, each core 110 includes an execution circuit 112. Execution circuit 112 may perform various operations in response to received instructions, including map table-based instructions as described herein. As further illustrated, each core 110 includes a cache hierarchy 115. In different implementations, cache hierarchy 115 may include multiple levels, including first, second and third level caches (L1, L2 and L3) internal to core 110, although more or fewer levels may be present. In addition or alternately, a last level cache may be a shared L3 system level cache external to cores 110.

In embodiments, at least one cache memory of cache hierarchy 115 may send coherency notifications to map table storage 114 to cause update to status of entries based on changes to coherency of an object. As further illustrated, each core 110 may include at least a portion of a memory management unit (MMU) 118. In an embodiment, memory management unit 118 may include a translation lookaside buffer (TLB), which stores virtual address-to-physical address translations, along with associated metadata. As will be described further herein, coherency of information in map table storage 114 may be maintained at least in part based on notifications received from cache hierarchy 115 as well as TLB 118. In the embodiment of FIG. 1, map table storage 114 is a separate hardware memory structure than cache hierarchy 115. In other embodiments, map table storage 114 may be included in cache hierarchy 115.

Still further as shown in FIG. 1, to enable coherency between different map tables in different cores, a map coherency subsystem 120 may be present. In embodiments, map coherency subsystem 120 may include a directory that receives and provides coherency updates, e.g., based on changes in the status of entries within various map tables 114. These coherency updates may be based on a loss of observability of a given object. The coherency directory tracks objects based on their virtual addresses and maintains information as to which core's map table holds ownership of the address and the coherent state of the address. Coherency updates may follow any known protocol, including modified, owned, exclusive, shared, invalid (MOESI), MESI, or MSI. As further shown, a cache coherency subsystem 125 may provide similar support for communication of cache coherency information between the cache hierarchy in different cores 110.

Understand while shown at this high level in the embodiment of FIG. 1, many variations and alternatives are possible. For example, while map table storage 114 is shown as a separate memory structure, in other cases the map table may be included within a portion of a cache hierarchy. Furthermore, while shown as a single level, in other cases a map table hierarchy may be present in which more frequently accessed and/or used objects may be stored in a smaller, lower latency map table level and other objects may be stored in a larger, higher latency level. Still further in other embodiments, MMU 118, map coherency subsystem 120, a cache controller of cache hierarchy 115, and/or a fabric (e.g., a mesh fabric or a virtualized fabric) may control addition, deletion and update of entries in map table storage 114, instead of or in addition to control circuit 113.

For hardware to support automatic enforcement of the user-space coherency table, some level of notification exists between caches and TLBs such that evictions are exposed to the map table, which contains the object status and version number tracking. While the map table described herein supports automated programmer transparent locks, this table could be used for other software problems in any concurrent reader-writer scenario, from databases to network packet processing. In accessing a map table, the user-space (process space) address of objects is used, which is virtual. As a result, the runtime or operating system can move physical pages without breaking the map table entries or triggering deadlock scenarios from improper sequencing of locks.

Referring now to Table 2, shown is an illustration of map control instructions of an ISA in accordance with an embodiment. As shown in Table 2, there may be multiple flavors of these map instructions, which relate to obtaining a transaction ID for a given transaction, adding objects into the map table for the transaction, locking the transaction within the map table to verify transaction results, and map maintenance instructions for terminating a transaction and deleting a completed transaction from the map table. Each instruction may have an opcode to specify an operation to be performed (e.g., a given map control and/or maintenance operation), one or more operands, immediates, and/or additional fields used in instruction execution, such as shown in Table 2. Understand of course that additional or different instructions may be present in other embodiments.

TABLE 2

| Instruction | Description |
| --- | --- |
| map.get <ID> | Returns a unique ID (token) across all map tables in a process. May return an error if no free IDs are available. This is used to declare a new transactional sequence for the mapping table. |
| map.add <result>, <ID>, <object address>, <intent> | Accepts object address, size, usage intent, and map.get token ID as inputs. May return an error if there is no free entry or the TLB map is full. All map table entries are checked for this object's address to ensure no duplicates arise.<br>During this operation, the object's current version number is read and stored in the map table so that it may be verified in the future that no unobserved modifications happened to the object information, such as when parts of the object were evicted from the cache and some other thread modified the object. If there is a free map table entry, and the version number is successfully read, the entry flag is set to OK.<br>All objects added to the map table may be kept in a sorted order to avoid dynamic execution deadlocks, such as sorted in ascending or descending order based on the virtual address of the object. The intent field is used to indicate whether the object will be accessed in a READ, WRITE, or RMW (read-modify-write) mode. Any attempt to add the same object to the same transaction will update the "intent" for that entry but will not allow duplicate entries or change the recorded map table version number of this object. |
| map.lock <ID> | Accepts a map.get token ID as input. Verifies all entry versions and states are OK. If an entry specifies a RECHECK, this operation will re-validate the version number to verify no changes took place in the object. If any entry is marked FAIL or a RECHECK object version number mismatch is detected between the memory image and the map table, then the transaction is immediately returned with a failure code.<br>This operation obtains locks across all map tables in this process space for each object involved in the transaction, regardless of whether they are marked with a READ, WRITE, or RMW intent. Since the objects in a transaction are kept in a sorted order, the lock sequence processes that list in order. |
| map.unlock <ID> | Accepts a map.get token ID as input. Unlocks all of the map table entries associated with the token ID's transaction via map.add to return to the default Map Table operation. |
| map.del <ID> | Accepts a map.get token ID as input. Invalidates all Map Table entries associated with the token ID. Releases the token ID for reuse. |
| map.rem <result>, <ID>, <object address> | Removed the specified object from a map.get token ID chain, freeing any held locks or other properties without examination. If the specified map.get token is invalid, or the object address is not part of the named sequence, an error code is returned |

What follows is a compiled code version of the canonical example of Table 1, in which a compiler has auto-injected additional operations including map-based instructions as in Table 2 to create transactional behavior. All code in underline can be automatically generated by the compiler, or explicitly coded by a programmer. All code without underline is the canonical code of Table 1.

```
loop:
    err = map.get ( &token)
    if (err) go to loop
    err |= map.add (A, SZ(A), RD, token)
    err |= map.add (B, SZ(B), RD, token)
    err |= map.add (C, SZ(C), RD, token)
    if (!err) {
        rd_obj (A)
        rd_obj (B)
        rd_obj (C)
        // do something
    }
    err |= map.add (D, SZ(D), WR, token)
    err |= map.add (E, SZ(E), WR, token)
    err |= map.lock (token)
    if (!err) {
        wr_obj (D)
        wr_obj (E)
    }
    map.unlock (token)
    map.del (token)
    if (err) go to loop
```

As shown above, the underlined code statements include map instructions as in Table 2 to first receive a token for a process (the map.get instruction) and then to add entries to a map table for each object read and/or written in the process (the map.add instructions). In turn, lock, unlock and delete instructions (map.lock, map.unlock and map.del) are included to manage coherency of this table and create transactional behavior.

Note that this code example lacks any sophisticated handling mechanisms for the "times(N) { . . . }" component of the canonical example. A major behavioral aspect of any hardware platform and supporting compiler framework is that all "map" family operations such as "map.add" and "map.lock" may be considered barriers that memory optimizations may not pass. For example, where a "map.add" instruction is present, the compiler cannot perform optimizations that would hoist memory operations above that "map.add" instruction. In the same respect, a core doing speculative execution does not perform any optimizations that involve memory that would hoist loads or stores beyond the program order occurrence of "map.add" in the dynamic stream.

With the assumption of objects containing a "version number" field in the first eight bytes of their in-memory structure, a simple map table can be built that complies with the prior discussion. It is assumed that each core has a map table, and a hardware coherency mechanism (similar to MESI) to enforce coherency of the tables for those cores participating in a specific process space.

Referring now to FIG. 2, shown is a block diagram of a map table in accordance with an embodiment. As shown in FIG. 2, map table 200 includes a plurality of entries $210_0$-$210_n$. As shown, each entry 210 includes a plurality of fields each of which to store a particular type of information. As illustrated, an address field 212 may be configured to store a virtual address for a given object. Note that this virtual address is a user space virtual address of the managed object. By way of the user-space virtual address-based configuration of map table 200, changes to physical addresses in which the object is stored may occur transparently and without effect on the validity of the objects and their entries in map table 200.

As further illustrated, each entry 210 includes a size field 214 to store a size of the object (e.g., in bytes). In addition a version field 215 may store a version number for the object at the time in which the entry is allocated into map table 200 for a specific transaction ID. In an embodiment, this version number may be obtained from the object itself when it is accessed. In an embodiment, the version number may be stored at a field in the first 8 bytes of the object. In addition, each entry 210 further includes an intent field 216. As illustrated, intent field 216 may define the corresponding objects to be intended for use for either read or write access (or read-modify-write (RMW) access)). Read-only objects may be easily shared with other map tables without problems; however any attempts to move an object to a write intent from other threads having a different token ID causes this core's map table for this object to be marked as a FAIL status. As further shown, each entry 210 includes a token field 218 to store a token. This token is a unique ID across all map tables in a process space that software uses to reference this entry as part of a "unique transaction ID." Multiple map table entries (objects) may be part of a single transaction.

Finally, a flags or status field 219 is present to store a status indicator associated with the object. In an embodiment, this status indicator provides status of the entry, and may be one of the following: "OK," indicating that no objects under observation have been modified or evicted due to coherency purposes; "RECHECK," indicating that the object may have changed due to coherency issues in the memory subsystem, and therefore each RECHECK-marked object in the transaction is to be verified as unchanged; and "FAIL," indicating that a coherency violation to a dirty state or a tracked object version number changed outside of the thread attempting to execute the active transaction occurred. Although shown with these particular fields in the example of FIG. 2, understand that a map table may include additional or different fields in other cases. For example, in some cases coherency information, e.g. according to a MESI cache coherency protocol also may be stored in each entry.

Using the illustrative compiler-generated code (in underline) described above, map table 200 of FIG. 2 can be populated during runtime with objects and metadata as shown in FIG. 2. Since each object is mapped at a different time $t_i$, map table 200 reflects various time values ($t_0$, $t_1$, etc.) for when these objects are entered, and their version numbers are first checked. In an embodiment, in response to a map.add instruction, map table 200 may be manipulated as appropriate, and once an entry is inserted into a free slot with total sorted order, a read of the first eight bytes of the object is initiated. Note that this operation may trigger a TLB mapping as well as a cache entry mapping. The "version number" field of the object accessed in this way at the proper $t_i$ would be stored in the map table to ensure no A/B/A issues occur during execution.

In the illustration of FIG. 2, it may be assumed that no TLB or cache evictions took place on the objects and therefore all flags in flags field 219 are shown as OK. In reality, evictions may occur during program execution, and map table 200 may be configured to receive side channel information from both the cache and TLB when evictions occur, to check whether an object may become affected by unobservable modifications from other threads. In one embodiment, map table 200 may notify the TLB, which in turn notifies the cache, when addresses are accessed via map table 200. These other units in turn may track this coherency/eviction information and only send eviction notices on "map table entry" marked addresses.

Understand that additional hardware structures of a processor also may include information regarding objects for purposes of the user-space object coherency support herein. Referring now to FIG. 3, shown is a block diagram of a translation lookaside buffer in accordance with an embodiment. As shown in FIG. 3, TLB 300 includes a plurality of entries $310_{0-n}$. As illustrated, each entry 310 may be for a given VA-to-PA translation. Further, each entry 310 may include object metadata information for use as described herein.

More specifically as shown, each entry 310 may include a tag field 312 to identify a TLB tag for the entry. In turn, base address fields 314, 315 provide, respectively, VA and PA base addresses. As shown, each VA base address may be for a 4K page of memory that includes at least one object. A size field 316 indicates a size of the page (e.g., 4 KB). And finally, a flags field 318 provides flags or indicators to identify objects of the page having entries in one or more map tables. In one embodiment, TLB 300 may be implemented as the data TLB 772 of the processor of FIG. 7B, discussed further below.

Note that a cache memory may similarly include object metadata for use to maintain coherency as described herein. Referring now to FIG. 4, shown is a block diagram of a cache memory in accordance with an embodiment. As shown in FIG. 4, cache memory 400 includes a plurality of entries $410_{0-n}$. As illustrated, each entry 410 may store information from a given physical address, and object metadata information for use as described herein.

More specifically as shown, each entry 410 may include a tag field 412 to identify a cache tag for the entry. Physical address field 414 provides a physical address from which a given object (or other data) was obtained. A coherency field 415 may store coherency information for the entry. In the embodiment shown, the coherency protocol may be a modified owned exclusive shared invalid (MOESI) protocol.

Coherency field 415 identifies a cache coherency state of the data of the entry. In addition, each entry 410 further includes a flags field 416 that provides flags or indicators to identify whether the entry is associated with an object having an entry in one or more map tables. Finally, a data field 418 may store the object itself (or least a portion thereof). As further shown, data field 418 also may store a version number for the object which, as discussed above, may be included in the first 8 bytes of the object as stored in memory.

Table 4 shows a map table coherency model based on a MESI coherency protocol, in accordance with an embodiment.

TABLE 4

| Map Table Access | Requestor | Description | MESI transition |
|---|---|---|---|
| map.add with RD intent | Local Core | Bring object into map table. Read intent, can "share" object. Version number is read, propagating the object into the TLB and cache. | I -> (S/E) |
| map.add with WR intent | Local Core | Bring object into map table. Write intent, cannot "share" object. If object already exists in Map Table, change intent to WR. Version number is read, causing the TLB and cache to populate the start of the object. | (I/S/E) -> E |
| Coherency Evict Object | Coherency Manager | Coherency protocol dictates invalidation; Mark object entry as "Fail" | (M/S/E) -> I |
| Coherency Shared Object | Coherency Manager | Other Map tables are requesting shared object | (E) -> S |
| Invalidate (Fail) | Local Cache | On a cache coherency evict, Map Table entry will be marked "Fail" and Map coherency will be sent an invalidation notification. | (M/S/E) -> I |

With embodiments, multi-object transactional atomic behavior may be realized in a deadlock-free way that allows a programmer to remain oblivious to how the hardware provides those features. Stated another way, optimizations and hardware operations to perform locking of objects involved in a transaction are transparent to the programmer, who may not have contemplated or include in a program the above-described map control instructions for effecting use of a map table as described herein.

As discussed above, a compiler may receive an uncompiled code from a programmer that is unaware of object coherency issues. In turn, in compiling the code the compiler may insert map control and other instructions as described herein to enable user-space multi-object transactional atomic operation. Note that the compiler itself may be implemented with code and may be stored in a non-transitory storage medium for execution on one or more processors.

Figure 5:
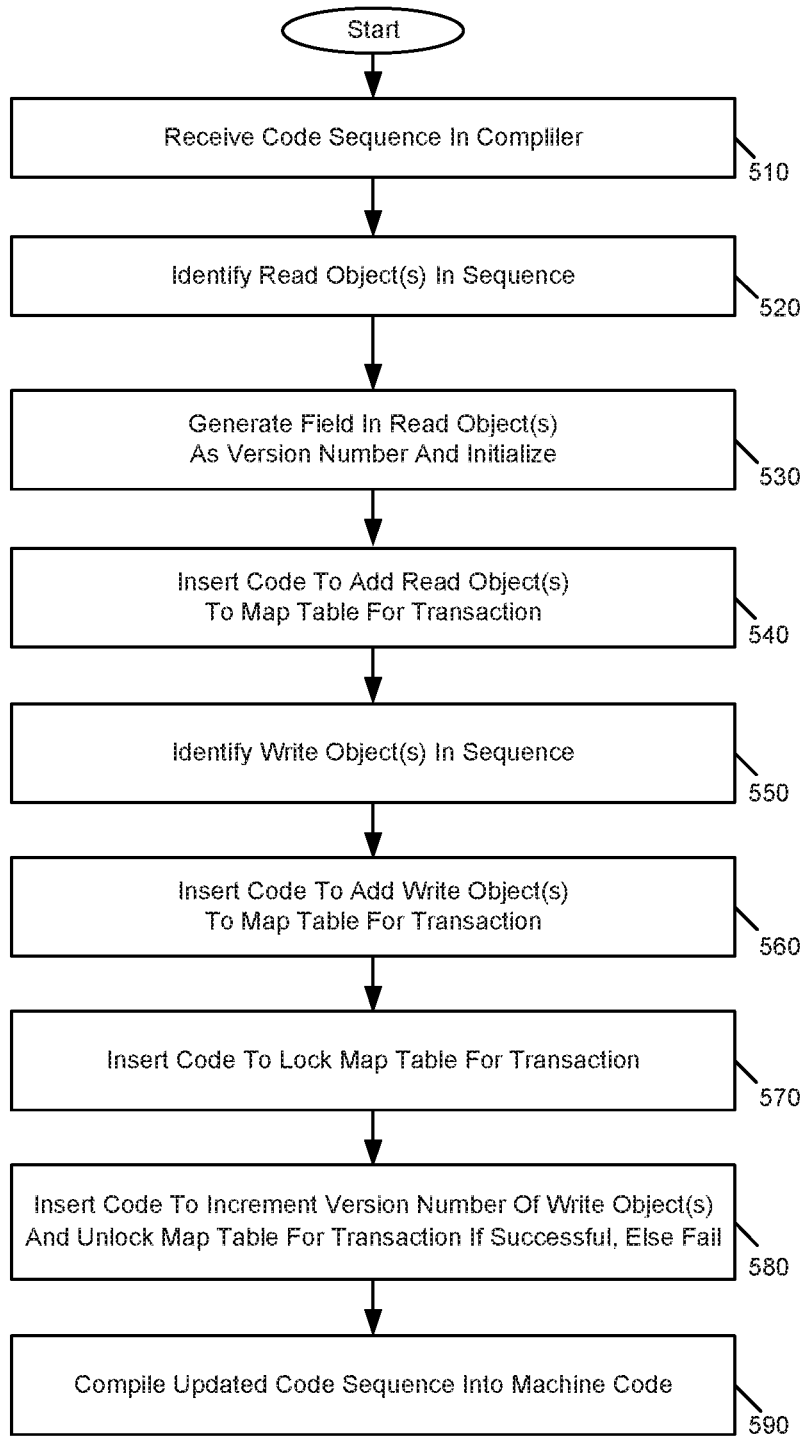
FIG. 5 is a flow diagram of operation a compiler in accordance with an embodiment.

Referring now to FIG. 5, shown is a flow diagram of a method of operation a compiler in accordance with an embodiment. As shown in FIG. 5, method 500 begins by receiving a code sequence in the compiler (block 510). Assume that this code sequence is of a canonical format in which various objects are obtained and used to perform one or more operations, the results of which are to be written to one or more other objects. At this high level, e.g., as provided by a programmer, assume there is no code for handling coherency issues with regard to the objects, e.g., which may be used by one or more other threads of a common process or one or more other processes. As such, the compiler may, transparently to the programmer, insert code to enable deadlock free operation.

As shown, at block 520 one or more read objects may be identified in the sequence. For each read object, at block 530 the compiler may, at declaration/signature time, generate a field in the object which may be used to store a version number. In addition, this version number may be initialized (e.g., to zero) at the declaration/signature time. Next at block 540 the compiler may insert code to add these one or more read objects to a map table for the transaction. For example, the compiler may insert map add instructions for each of the read objects.

Still referring to FIG. 5, next at block 550 one or more write objects may be identified in the sequence. For each write object, at block 560 the compiler may insert code to add these one or more write objects to the map table for the transaction, e.g., via map add instructions.

In addition to inserting code for adding various objects to the map table, at block 570 the compiler may insert code to lock the map table for the transaction. Note that this code may be inserted in a location of the code sequence after the transaction is executed, but prior to it being committed by way of writing to a global globally visible location, e.g., the write objects themselves. Note that during execution of the code sequence, upon locking the map table it can be determined whether any of the objects used in the transaction changed during the transaction such that stale data may have been used. In addition, at block 570 the compiler may also insert code to enable update to version numbers for each written object, whether it is written in response to write operation or a read-modify-write operation, before the object update is completed.

Still with reference to FIG. 5, the compiler also may insert code to unlock the map table for the transaction (block 580). Note that this unlocking occurs after the lock process is completed. If the transaction successfully completed, a version number of each written object (whether a write or a read-modify-write) is incremented or otherwise updated before the object update is finished and the map table is unlocked. If instead one or more objects changed state or are otherwise invalid, the transaction may be caused to fail by way of code insertion for this situation. At this point, the sequence has been compiled to provide hardware-based user-space object coherency support. As such, at block 590 the updated code sequence can be compiled into machine code. Understand this machine code may be stored in a non-transitory storage medium for execution during normal system operation to perform transactions with programmer transparent support for user-space multi-object transactional atomic operation. Understand while shown at this high level in the embodiment of FIG. 5, many variations and alternatives are possible.

Figure 6:
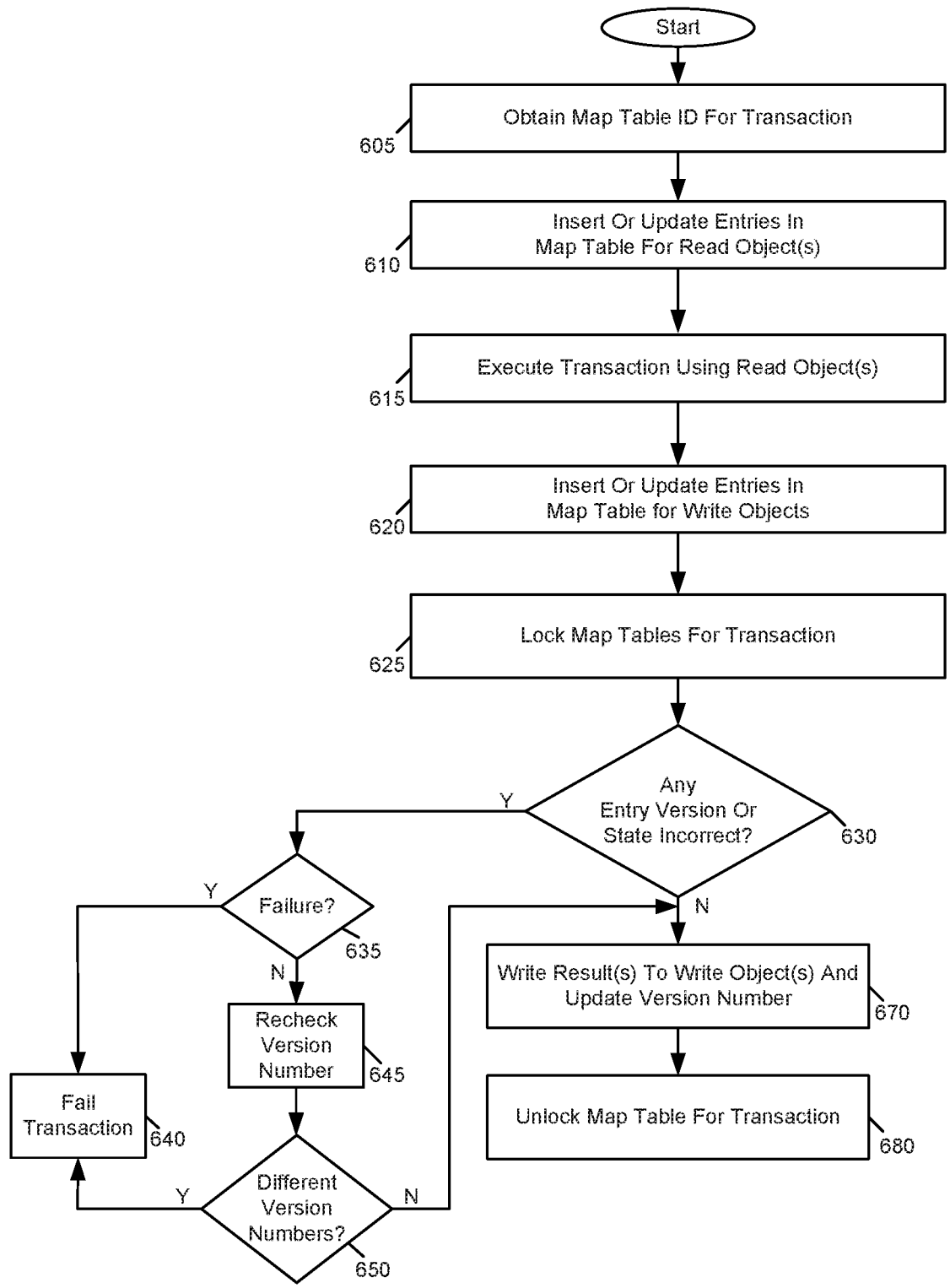
FIG. 6 is a flow diagram of a method in accordance with another embodiment.

Referring now to FIG. 6, shown is a flow diagram of a method in accordance with another embodiment. More specifically, method 600 of FIG. 6 is a method for executing compiled code to perform a user-space multi-object transactional atomic operation. As such, method 600 may be performed by hardware circuitry of a core, which may include processing circuitry (e.g., processing device, circuitry, dedicated logic, programmable logic, microcode, etc.) to perform the method and which may execute firmware and/or software (e.g., instructions run on a processing device), as examples. In some implementations, method 600 may be performed by one or more cores 110 of FIG. 1, including one or more execution circuits 112 leveraging a map table storage 114 or other appropriate mechanism.

As illustrated, method 600 begins by obtaining a map table ID for the transaction, e.g., in response to a map get instruction as described herein (block 605). This map table ID may be obtained from a controller of the map table, which may issue a unique ID, e.g. in the form of a token that is unique across all map tables and processes. Next at block 610 one or more entries in the map table may be inserted for read objects of the transaction, e.g., in response to a map add instruction as described herein. Note that various information may be included in these entries, including a user-space address of the object, size, usage intent and token ID. In addition, the entry also may store a current version number of the object as read from the memory. Assuming there is a free map table entry and the version number is successfully obtained and stored, a flag for the entry may be set to an OK status.

Still with reference to FIG. 6, next at block 615 the transaction may be executed using the one or more read objects. Note that the results of the execution may be stored in thread local variables and not committed at this point (block 620). After the transaction executes, additional entries may be inserted in the map table for one or more write objects, e.g., in response one or more map get and map add instructions as described herein. Note that the same information as described above for read objects may be stored for the write objects. In addition, one or more existing entries may be updated such as where an object originally marked as read-only pivots to a read-modify-write or other intent. Then at block 625 all map tables of the processor may be locked for this transaction, e.g., in response to a map lock instruction as described herein. To this end, each entry may include a lock state indicator to indicate whether the entry is locked, and if so entries are not allowed to be read or written by another thread.

As part of the lock process, at diamond 630 each entry of the transaction may be checked in order to determine whether there is an error in version number or a state other than OK exists (e.g. recheck or fail). If all the entries are indicated to be in OK state and there are no version number issues, control passes directly to block 670 where the results may be written to the write objects. Still further, the version number included in these write objects entries may be updated (e.g. incremented) to identify this update to the write objects' value. Thereafter at block 680 the map table may be unlocked, e.g., in response to a map unlock instruction as described herein. Understand that additional operations, such as deleting or invalidating all map table entries for the transaction may occur.

Still with reference to FIG. 6, instead if it is determined that there is some inconsistency (as determined at diamond 630), control passes to block 635 to determine whether an entry of the map table transaction is of a failure status. If so, control passes to block 660 where the transaction may be failed. Understand that various operations to handle a failure state of the transaction may occur. In some cases, the transaction may be retried one or more times in response to such failure.

Instead if it is determined that there are no fail entries, but there are recheck status entries, the version numbers of the corresponding objects may be validated (block 640). To this end, the version number of the objects in memory may be obtained and compared to the version number present in the map table entries to determine whether a change took place in the object. If version numbers are different as determined at diamond 650, the transaction may fail (at block 660, discussed above). Otherwise, if there are no changes in the version numbers, control may pass to block 670 where the transaction may commit. Understand while shown at this high level in the embodiment of FIG. 6, many variations and alternatives are possible.

Figure 7A:
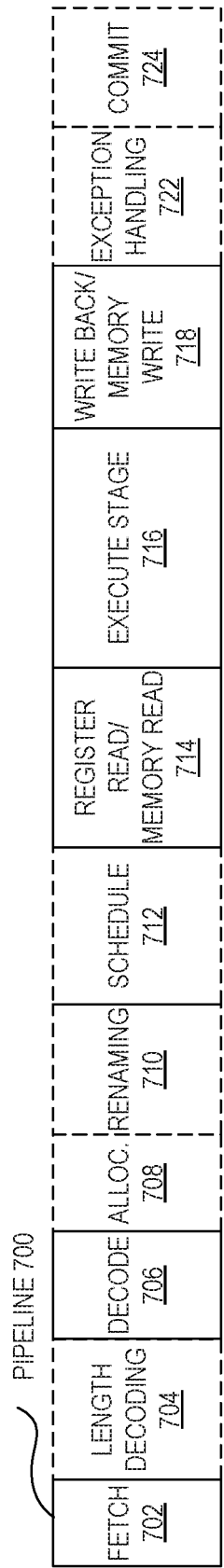
FIGS. 7A and 7B illustrate block diagrams of core architectures.
Figure 7B:
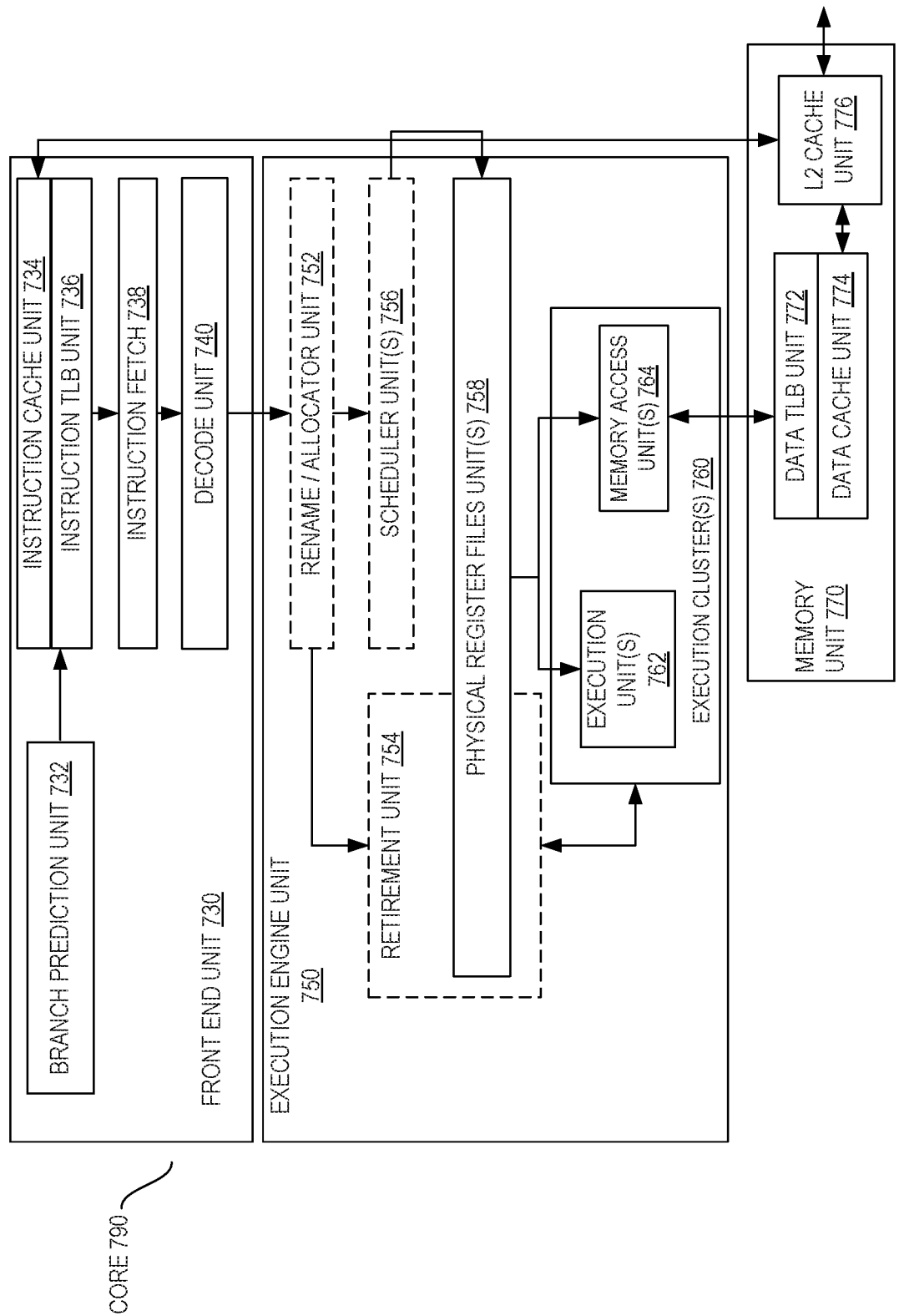

Understand that embodiments may be used in connection with many different processor architectures. FIG. 7A is a block diagram illustrating both an exemplary in-order pipeline and an exemplary register renaming, out-of-order issue/execution pipeline according to embodiments of the invention. FIG. 7B is a block diagram illustrating both an exemplary embodiment of an in-order architecture core and an exemplary register renaming, out-of-order issue/execution architecture core to be included in a processor according to embodiments of the invention. Such embodiments may be used to provide user space multi-object transactional atomic operation of code sequences. The solid lined boxes in FIGS. 7A and 7B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724. Note that as described herein, in a given embodiment a core may include multiple processing pipelines such as pipeline 700.

FIG. 7B shows processor core 790 including a front end unit 730 coupled to an execution engine unit 750, and both are coupled to a memory unit 770. The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit 740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macroinstructions (e.g., in decode unit 740 or otherwise within the front end unit 730). The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 758 comprises a vector registers unit, a write mask registers unit, and a scalar registers unit. These register units may provide architectural vector registers, vector mask registers, and general purpose registers. The physical register file(s) unit(s) 758 is overlapped by the retirement unit 754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1356, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary embodiment, the memory access units 764 may include a load unit, a store address unit, and a store data unit, each of which is coupled to the data TLB unit 772 in the memory unit 770. The instruction cache unit 734 is further coupled to a level 2 (L2) cache unit 776 in the memory unit 770. The L2 cache unit 776 is coupled to one or more other levels of cache and eventually to a main memory.

By way of example, the exemplary register renaming, out-of-order issue/execution core architecture may implement the pipeline 700 as follows: 1) the instruction fetch 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722; and 8) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 790 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 734/774 and a shared L2 cache unit 776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 8:
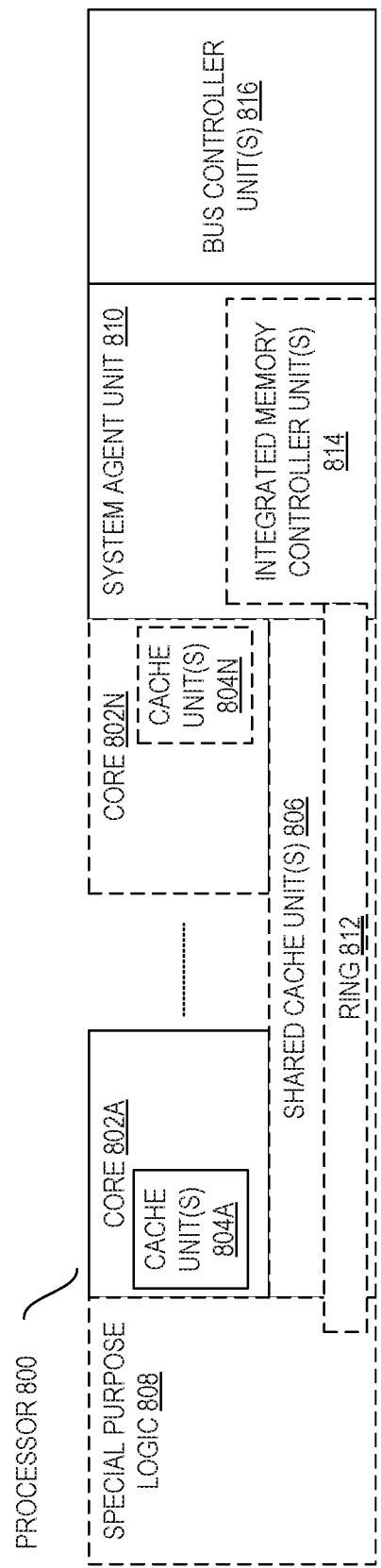
FIG. 8 is a block diagram of a processor that may have more than one core, may have an integrated memory controller, and may have integrated graphics according to embodiments of the invention.

FIG. 8 is a block diagram of a processor 800 that may have more than one core, may have an integrated memory controller, and may have integrated graphics according to embodiments of the invention. The solid lined boxes in FIG. 8 illustrate a processor 800 with a single core 802A, a system agent 810, a set of one or more bus controller units 816, while the optional addition of the dashed lined boxes illustrates an alternative processor 800 with multiple cores 802A-N, a set of one or more integrated memory controller unit(s) in the system agent unit 810, and special purpose logic 808.

Thus, different implementations of the processor 800 may include: 1) a CPU with the special purpose logic 808 being integrated graphics and/or scientific (throughput) logic (which may include one or more cores), and the cores 802A-N being one or more general purpose cores (e.g., general purpose in-order cores, general purpose out-of-order cores, a combination of the two); 2) a coprocessor with the cores 802A-N being a large number of special purpose cores intended primarily for graphics and/or scientific (throughput); and 3) a coprocessor with the cores 802A-N being a large number of general purpose in-order cores. Thus, the processor 800 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1400 may be a part of and/or may be implemented on one or more substrates using any of a number of process technologies, such as, for example, BiCMOS, CMOS, or NMOS.

The memory hierarchy includes one or more levels of cache units 804A-N within the cores, a set or one or more shared cache units 806, and external memory (not shown) coupled to the set of integrated memory controller units 814. The set of shared cache units 806 may include one or more mid-level caches, such as level 2 (L2), level 3 (L3), level 4 (L4), or other levels of cache, a last level cache (LLC), and/or combinations thereof. While in one embodiment a ring based interconnect unit 812 interconnects the special purpose logic 808, the set of shared cache units 806, and the system agent unit 810/integrated memory controller unit(s) 814, alternative embodiments may use any number of well-known techniques for interconnecting such units. In one embodiment, coherency is maintained between one or more cache units 806 and cores 802A-N, to enable user space multi-object transactional atomic operation as described herein.

The system agent unit 810 includes those components coordinating and operating cores 802A-N. The system agent unit 810 may include for example a power control unit (PCU) and a display unit. The PCU may be or include logic and components needed for regulating the power state of the cores 802A-N and the special purpose logic 808. The display unit is for driving one or more externally connected displays.

The cores 802A-N may be homogenous or heterogeneous in terms of architecture instruction set; that is, two or more of the cores 802A-N may be capable of execution the same instruction set, while others may be capable of executing only a subset of that instruction set or a different instruction set.

Figure 9:
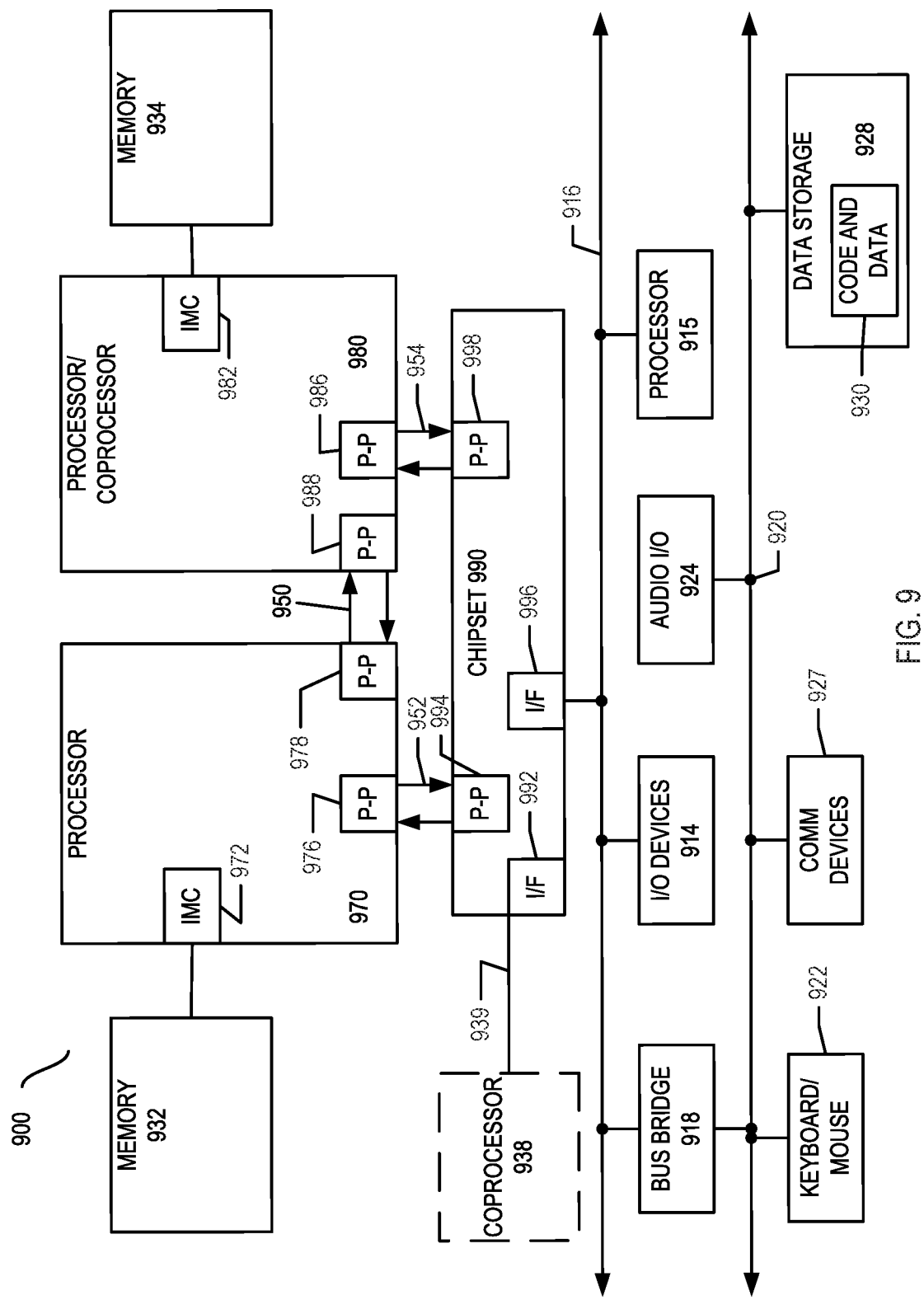
FIG. 9 is a block diagram of a first more specific exemplary system in accordance with an embodiment of the present invention.
Figure 10:
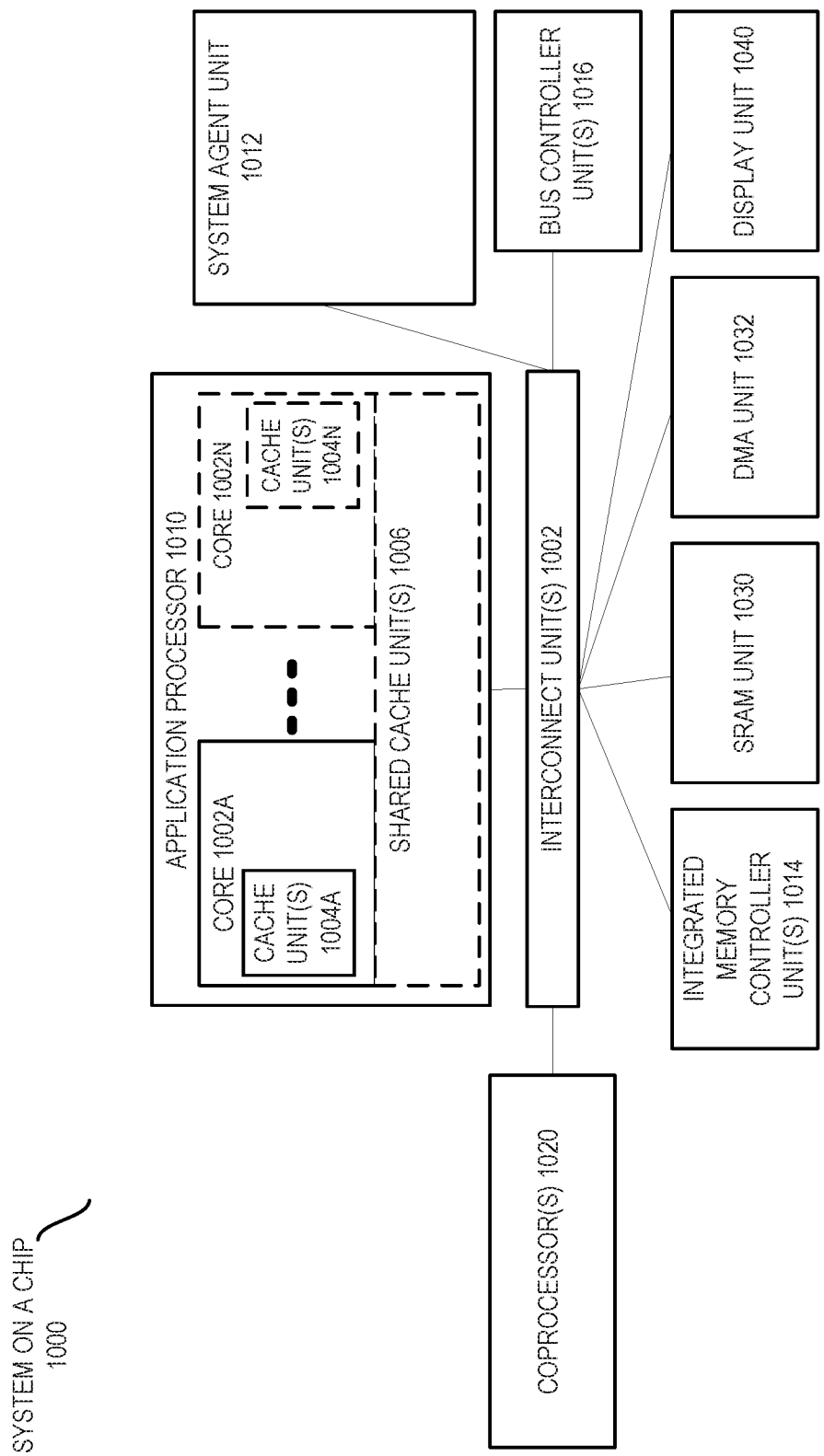
FIG. 10 is a block diagram of a SoC in accordance with an embodiment of the present invention.

FIGS. 9-10 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 9, shown is a block diagram of a first more specific exemplary system 900 in accordance with an embodiment of the present invention. As shown in FIG. 9, multiprocessor system 900 is a point-to-point interconnect system, and includes a first processor 970 and a second processor 980 coupled via a point-to-point interconnect 950. Each of processors 970 and 980 may be some version of the processor 900.

Processors 970 and 980 are shown including integrated memory controller (IMC) units 972 and 982, respectively. Processor 970 also includes as part of its bus controller units point-to-point (P-P) interfaces 976 and 978; similarly, second processor 980 includes P-P interfaces 986 and 988. Processors 970, 980 may exchange information via a point-to-point (P-P) interface 950 using P-P interface circuits 978, 988. As shown in FIG. 9, IMCs 972 and 982 couple the processors to respective memories, namely a memory 932 and a memory 934, which may be portions of main memory locally attached to the respective processors.

Processors 970, 980 may each exchange information with a chipset 990 via individual P-P interfaces 952, 954 using point to point interface circuits 976, 994, 986, 998. Chipset 990 may optionally exchange information with the coprocessor 938 via a high-performance interface 939. In one embodiment, the coprocessor 938 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 990 may be coupled to a first bus 916 via an interface 996. In one embodiment, first bus 916 may be a Peripheral Component Interconnect (PCI) bus, or a bus such as a PCI Express bus or another third generation I/O interconnect bus, although the scope of the present invention is not so limited.

As shown in FIG. 9, various I/O devices 914 may be coupled to first bus 916, along with a bus bridge 918 which couples first bus 916 to a second bus 920. In one embodiment, one or more additional processor(s) 915, such as coprocessors, high-throughput MIC processors, GPGPU's, accelerators (such as, e.g., graphics accelerators or digital signal processing (DSP) units), field programmable gate arrays, or any other processor, are coupled to first bus 916. In one embodiment, second bus 920 may be a low pin count (LPC) bus. Various devices may be coupled to a second bus 920 including, for example, a keyboard and/or mouse 922, communication devices 927 and a storage unit 928 such as a disk drive or other mass storage device which may include instructions/code and data 930, in one embodiment. Further, an audio I/O 924 may be coupled to the second bus 920. Note that other architectures are possible. For example, instead of the point-to-point architecture of FIG. 9, a system may implement a multi-drop bus or other such architecture.

Referring now to FIG. 10, shown is a block diagram of a SoC 1000 in accordance with an embodiment of the present invention. Dashed lined boxes are optional features on more advanced SoCs. In FIG. 10, an interconnect unit(s) 1002 is coupled to: an application processor 1010 which includes a set of one or more cores 1002A-N (including constituent cache units 1004A-N) and shared cache unit(s) 1006; a system agent unit 1012; a bus controller unit(s) 1016; an integrated memory controller unit(s) 1014; a set or one or more coprocessors 1020 which may include integrated graphics logic, an image processor, an audio processor, and a video processor; a static random access memory (SRAM)

unit 1030; a direct memory access (DMA) unit 1032; and a display unit 1040 for coupling to one or more external displays. In one embodiment, the coprocessor(s) 1020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 930 illustrated in FIG. 9, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 11:
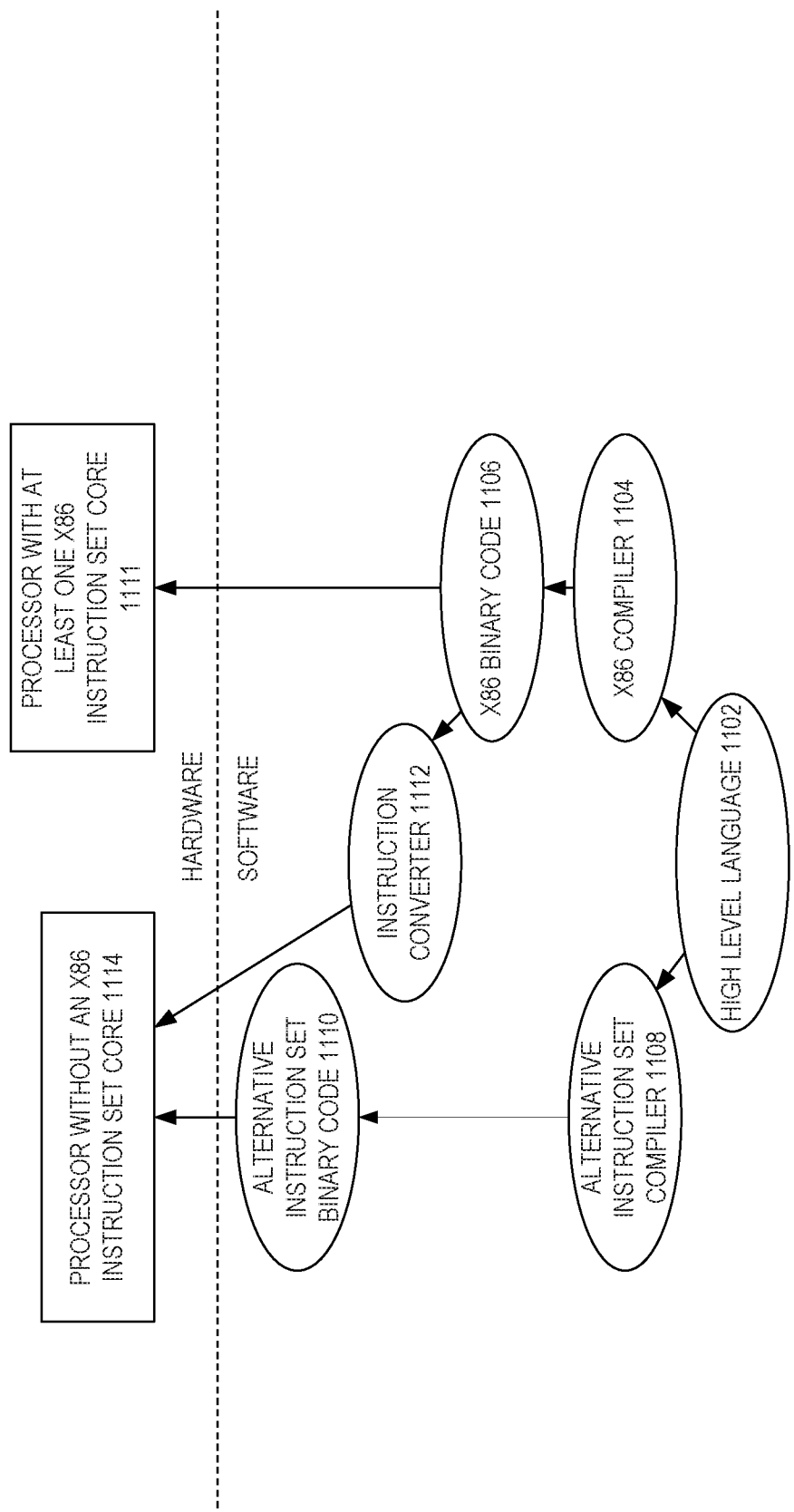
FIG. 11 is a block diagram contrasting the use of a software instruction converter to convert binary instructions in a source instruction set to binary instructions in a target instruction set according to embodiments of the invention

FIG. 11 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 11 shows a program in a high level language 1102 may be compiled using an x86 compiler 1104 to generate x86 binary code 1106 that may be natively executed by a processor with at least one x86 instruction set core 1116. The processor with at least one x86 instruction set core 1116 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1104 represents a compiler that is operable to generate x86 binary code 1106 (e.g., object code) that can, with or without additional linkage processing, be executed on the processor with at least one x186 instruction set core 1116. Similarly, FIG. 11 shows the program in the high level language 1102 may be compiled using an alternative instruction set compiler 1108 to generate alternative instruction set binary code 1110 that may be natively executed by a processor without at least one x86 instruction set core 1114 (e.g., a processor with cores that execute the MIPS instruction set of MIPS Technologies of Sunnyvale, CA and/or that execute the ARM instruction set of ARM Holdings of Sunnyvale, CA). The instruction converter 1112 is used to convert the x86 binary code 1106 into code that may be natively executed by the processor without an x86 instruction set core 1114. This converted code is not likely to be the same as the alternative instruction set binary code 1110 because an instruction converter capable of this is difficult to make; however, the converted code will accomplish the general operation and be made up of instructions from the alternative instruction set. Thus, the instruction converter 1112 represents software, firmware, hardware, or a combination thereof that, through emulation, simulation or any other process, allows a processor or other electronic device that does not have an x86 instruction set processor or core to execute the x86 binary code 1106.

The following examples pertain to further embodiments.

In one example, a processor comprises: an execution circuit to execute instructions; at least one cache memory coupled to the execution circuit; and a table storage element coupled to the at least one cache memory, the table storage element to store a plurality of entries each to store object metadata of an object used in a code sequence, where the processor is to use the object metadata to provide user space multi-object transactional atomic operation of the code sequence.

In an example, the processor is to store, in response to a map add instruction of the code sequence, in a first entry of the plurality of entries, first object metadata comprising a version number of a first object, a status of the first object, and a user space virtual address of the first object.

In an example, when the status of the first object is a recheck status, the processor is to obtain the first object from a physical location and determine, based at least in part on the version number of the first object in the first entry and a version number of the first object from the physical location, whether the first object has been modified.

In an example, the processor, in response to a determination that the first object has been modified, is to report a failure and terminate the code sequence.

In an example, the processor is to update the status of the first object to be in a recheck status in response to receipt of an eviction message from the at least one cache memory for the first object.

In an example, the processor is to update the status of the first object to be in a failure status in response to an update to a usage intent for the first object from a second thread, the code sequence of a first thread.

In an example, in response to a map lock instruction of the code sequence, the processor is to verify a plurality of the entries of the table associated with the code sequence, and to indicate a failure of the user space multi-object transactional atomic operation, if any of the plurality of entries are not verified.

In an example, in response to a map add instruction for a first object, the execution circuit is to obtain the first object, enable at least a portion of the first object to be stored in the at least one cache memory, and store a version number of the first object and a usage intent for the first object in a first entry of the table storage element.

In an example, the processor comprises a plurality of cores, where at least some of the plurality of cores comprise the execution circuit, the at least one cache memory and the table storage element.

In an example, the processor further comprises a coherency manager coupled to the plurality of cores, where in response to information of a first entry associated with a first object from a first table storage element of a first core, the coherency manager is to send an invalidation notification to a second table storage element of a second core to cause the second core to update a status of an entry of the second table storage element associated with the first object to a fail status.

In an example, a first entry of the at least one cache memory comprises a first field to store an object identifier to indicate that data of the first entry includes an object used in the code sequence having a corresponding entry in the table storage element.

In an example, in response to an update to a coherency state of the first entry, the at least one cache memory is to send a notification to a controller of the table storage element to cause an update to a state of the object.

In an example, the processor is to prevent speculative execution of a memory operation that follows the code sequence in program order.

In another example, a method comprises: receiving, in a compiler, a code sequence; identifying, in the compiler, one or more read objects in the code sequence, and inserting, for each of the one or more read objects, a map add instruction into the code sequence, the map add instruction to cause a processor to write an entry into a map table for a corresponding one of the one or more read objects; inserting a map lock instruction into the code sequence following one or more data manipulation instructions of the code sequence, the map lock instruction to cause the processor to lock the map table with respect to the code sequence and verify whether any of the one or more read objects were modified during execution of the code sequence outside of the code sequence; and compiling the code sequence into a compiled code sequence and storing the compiled code sequence in a storage, the compiled code sequence to enable the processor to provide hardware support of multi-object coherency atomic transactional operation transparently to a programmer of the code sequence.

In an example, the method further comprises identifying, in the compiler, one or more write objects in the code sequence, and inserting, for each of the one or more write objects, a map add instruction into the code sequence, the map add instruction to cause the processor to write an entry into the map table for a corresponding one of the one or more write objects.

In an example, the method further comprises inserting a map unlock instruction into the code sequence, the map unlock instruction to cause the processor to unlock the map table after the verification of whether any of the one or more read objects were modified.

In an example, the method further comprises inserting an update instruction into the code sequence, the update instruction to cause the processor to update a version number of a first write object of the one or more write objects stored in the map table to indicate a write to the first write object during the code sequence.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In yet another example, a system comprises: a processor and a system memory coupled to the processor. The processor may include: a first core having a first execution circuit to execute instructions, a first cache memory coupled to the first execution circuit, and a first table storage element to store a first plurality of entries each to store object metadata of an object used in a code sequence, the object metadata including a user space address of the object, where in response to a map add instruction of an instruction set architecture, the first table storage element is to store a user space address of a first object and a version number of the first object in a first entry of the first table storage element; a second core having a second execution circuit to execute instructions, a second cache memory coupled to the second execution circuit, and a second table storage element including a second plurality of entries each to store object metadata of an object used in another code sequence; and a coherency circuit coupled to the first core and the second core, where in response to eviction of the first entry from the first table storage element, the coherency circuit is to send an invalidation message to the second table storage element to cause the second table storage element to update a status of an entry associated with the first object in the second table storage element to a fail state.

In an example, the processor, in response to a map lock instruction of the code sequence, is to verify one or more of the first plurality of entries of at least the first table storage element associated with the code sequence, and to indicate a failure of a user space multi-object transactional atomic operation of the code sequence, if any of the one or more of the first plurality of entries are not verified.

In an example, when a status of the first object is a recheck state, the processor is to obtain a plurality of objects of the code sequence from a memory and determine whether any of the plurality of objects has been modified outside of the code sequence.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   an execution circuit to execute instructions;
   at least one cache memory coupled to the execution circuit; and
   a table storage element coupled to the at least one cache memory, the table storage element to store a plurality of entries each to store object metadata of an object used in a code sequence, wherein the processor is to use the object metadata to provide user space multi-object transactional atomic operation of the code sequence.

2. The processor of claim 1, wherein the processor is to store, in response to a map add instruction of the code sequence, in a first entry of the plurality of entries, first object metadata comprising a version number of a first object, a status of the first object, and a user space virtual address of the first object.

3. The processor of claim 2, wherein when the status of the first object is a recheck status, the processor is to obtain the first object from a physical location and determine, based at least in part on the version number of the first object in the first entry and the version number of the first object from the physical location, whether the first object has been modified.

4. The processor of claim 3, wherein the processor, in response to a determination that the first object has been modified, is to report a failure and terminate the code sequence.

5. The processor of claim 2, wherein the processor is to update the status of the first object to be in a recheck status in response to receipt of an eviction message from the at least one cache memory for the first object.

6. The processor of claim 2, wherein the processor is to update the status of the first object to be in a failure status in response to an update to a usage intent for the first object from a second thread, the code sequence of a first thread.

7. The processor of claim 1, wherein in response to a map lock instruction of the code sequence, the processor is to verify a plurality of the entries of the table storage element associated with the code sequence, and to indicate a failure of the user space multi-object transactional atomic operation, if any of the plurality of entries are not verified.

8. The processor of claim 1, wherein in response to a map add instruction for a first object, the execution circuit is to obtain the first object, enable at least a portion of the first object to be stored in the at least one cache memory, and store a version number of the first object and a usage intent for the first object in a first entry of the table storage element.

9. The processor of claim 1, wherein the processor comprises a plurality of cores, wherein at least some of the plurality of cores comprise the execution circuit, the at least one cache memory and the table storage element.

10. The processor of claim 9, further comprising a coherency manager coupled to the plurality of cores, wherein in response to information of a first entry associated with a first object from a first table storage element of a first core, the coherency manager is to send an invalidation notification to a second table storage element of a second core to cause the second core to update a status of an entry of the second table storage element associated with the first object to a fail status.

11. The processor of claim 1, wherein a first entry of the at least one cache memory comprises a first field to store an object identifier to indicate that data of the first entry includes an object used in the code sequence having a corresponding entry in the table storage element.

12. The processor of claim 11, wherein in response to an update to a coherency state of the first entry, the at least one cache memory is to send a notification to a controller of the table storage element to cause an update to a state of the object.

13. The processor of claim 1, wherein the processor is to prevent speculative execution of a memory operation that follows the code sequence in program order.

14. A system comprising:
a processor comprising:
- a first core having a first execution circuit to execute instructions, a first cache memory coupled to the first execution circuit, and a first table storage element to store a first plurality of entries each to store object metadata of an object used in a code sequence, the object metadata including a user space address of the object, wherein in response to a map add instruction of an instruction set architecture, the first table storage element is to store a user space address of a first object and a version number of the first object in a first entry of the first table storage element;
- a second core having a second execution circuit to execute instructions, a second cache memory coupled to the second execution circuit, and a second table storage element to store a second plurality of entries each to store object metadata of an object used in another code sequence; and
- a coherency circuit coupled to the first core and the second core, wherein in response to eviction of the first entry from the first table storage element, the coherency circuit is to send an invalidation message to the second table storage element to cause the second table storage element to update a status of an entry associated with the first object in the second table storage element to a fail state; and
- a system memory coupled to the processor.

15. The system of claim 14, wherein the processor, in response to a map lock instruction of the code sequence, is to verify one or more of the first plurality of entries of at least the first table storage element associated with the code sequence, and to indicate a failure of a user space multi-object transactional atomic operation of the code sequence, if any of the one or more of the first plurality of entries are not verified.

16. The system of claim 14, wherein when a status of the first object is a recheck state, the processor is to obtain a plurality of objects of the code sequence from a memory and determine whether any of the plurality of objects has been modified outside of the code sequence.

* * * * *